J. G. PFISTER.
COTTER KEY.
APPLICATION FILED APR. 6, 1915.
1,244,076.
Patented Oct. 23, 1917.
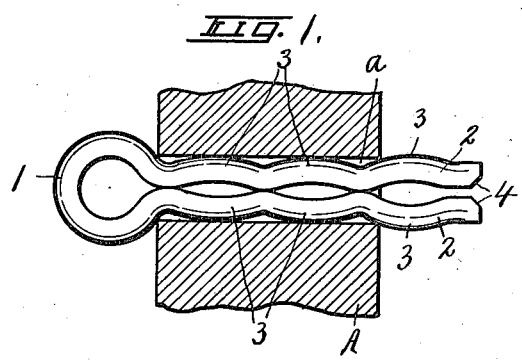
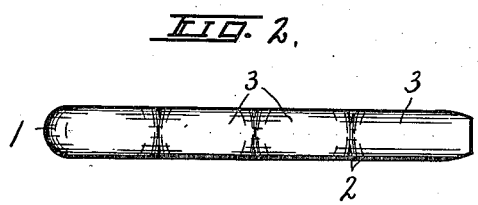
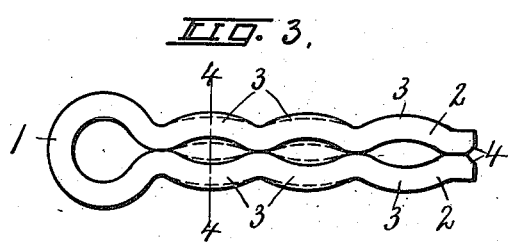
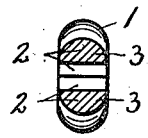
WITNESSES
J. L. Bubb
H. E. Chace
BY
INVENTOR
J. G. Pfister
Howard P. Denison
ATTORNEY

UNITED STATES PATENT OFFICE.

JOHN G. PFISTER, OF SYRACUSE, NEW YORK.

COTTER-KEY.

1,244,076.                              Specification of Letters Patent.        Patented Oct. 23, 1917.

Application filed April 6, 1915. Serial No. 19,486.

*To all whom it may concern:*

Be it known that I, JOHN G. PFISTER, a citizen of the United States, and a resident of Syracuse, in the county of Onondaga, in the State of New York, have invented new and useful Improvements in Cotter-Keys, of which the following, taken in connection with the accompanying drawings, is a full, clear, and exact description.

This invention relates to certain improvements in cotter keys for retaining nuts, bolts and similar articles in operative position against accidental displacement, and refers more particularly to that class which is made up of a single piece of half round wire bent upon itself to form a loop or ring at one end and opposite arms adapted to pass through the aperture in the bolt or similar device for holding it or some other part thereof in operative position, and at the same time permitting one or both of the protruding ends of the arms to be bent or deflected sufficiently to prevent accidental displacement of the cotter key.

These cotter pins or keys are used extensively on railway cars and vehicles where they are subjected to more or less severe strains or jolts tending to loosen them or at least cause them to rattle in their bearings. The assembling of these cotter pins on the various parts of different vehicles and in various kinds of machinery is usually left to some inexperienced or careless operator with the result that they are frequently left insecure by reason of failure to spread the protruding ends sufficiently to prevent displacement, and one of the main objects of my present invention is to provide a cotter key of the character described which will be self-retaining when driven into the opening of a bolt or other part adapted to receive the same without necessitating the extra operation of spreading the protruding ends, and at the same time to reduce the area of contact of the cotter key with the walls of the bore to a minimum so that the key may be more easily removed even though the relatively small contact areas may become rusted to the object in which the key is inserted.

Another object is to prevent rattling of the cotter key when placed in operative position, both of these objects being carried out by corrugating both arms longitudinally in such manner as to cause the corrugated parts to compress when the key is driven into the opening and to expand against the walls of said opening with sufficient friction to prevent accidental displacement or rattle, while the protruding end corrugations which are free to expand sufficiently to engage the edges of the adjacent end of the opening further prevent accidental displacement, and in fact tend to draw the head of the key more firmly against the opposite side of the part through which the arms of the key are passed.

Other objects and uses will be brought out in the following description.

In the drawings—

Figure 1 is a sectional view of a portion of a bolt or other object showing my improved cotter key in operative position in the opening thereof.

Fig. 2 is an edge view of the same key.

Fig. 3 is a side elevation of the detached key shown in Fig. 1 in its normal condition, the dotted lines showing the position to which the corrugations are compressed when inserted in the opening of a bolt or other object.

Fig. 4 is a sectional view taken on line 4—4, Fig. 3.

This cotter key may be made in various standard sizes according to the work which it is required to perform or objects with which it is to be used, and preferably consists of a single piece of half round wire or equivalent somewhat resilient bendable metal folded or bent upon itself intermediate its ends to form an enlarged loop or ring —1— and opposite arms —2— which are corrugated lengthwise at suitable intervals to form a plurality of arches or bow sections —3— of substantially uniform lengths and arcs, the bows of opposite arms being reversely disposed and directly opposed to each other so that the adjacent faces of their ends will contact while the opposed bow portions are arched outwardly from each other with their rounding faces outermost and their flat faces adjacent.

The loop or ring —1— on the head of the key is of somewhat greater diameter than the distance across the adjacent loops from outside to outside and, therefore, of greater diameter than that of the opening as —a— through which the key is passed so as to limit the inward driving movement of said key.

As previously stated, the keys will be made to fit standard sizes of openings and will be provided with two or more corrugations or bow sections —3— according to the width or diameter of the object with which they are to be used or through which they are adapted to pass, and to this end the diameter of the key at the ends of the bows will be slightly less than the diameter of the opening in which the key is adapted to be driven, while the extreme diameter from outside to outside across the center of adjacent bows will be normally slightly greater than the diameter of said opening, and therefore, quite a little greater than the diameter of the key at the ends of the bows so that when the key is driven into the bore or opening —a— of the object as —A—, the bows therein will be compressed or placed under tension, thereby causing their outer faces to frictionally engage the walls of the opening to hold the key in operative position, while the end bows which have been driven entirely through and beyond the object will be free to expand under their own tension against the adjacent end of said walls to afford additional means for retaining the key in its adjusted position, it being understood that the selected key will always be of sufficient length to allow the end bows to protrude through and beyond the object when the head is engaged with the opposite side of said object, thereby not only assuring the retention of the key when once driven in place, but also preventing any possibility of rattle.

In the use of the ordinary key where the arms are uncorrugated or perfectly straight from end to end and snugly fit within the opening, considerable difficulty has been experienced particularly in railroad work in removing the broken keys owing to the fact that they become rusted in the object in which they are driven, and another one of the objects of my invention is to reduce the area of contact of the key with the walls of the opening to a minimum, so that even though they should rust at the point of contact, the remaining portions thereof will be out of contact and thus permit the key to be more easily driven out when necessary from any cause.

In this connection, it will be observed that the exterior surfaces of the opposite arms of the key at the ends of the corrugations or bow sections are spaced apart from the walls of the opening —a—, and that the central portions of opposite bows are spaced from each other while the high points of the bows in contact with said walls are of relatively small area to produce the result or effect just described. That is, the high points of the arches or bow sections —3— constitute raised peripheral contact points in spaced relation longitudinally to engage the walls of the bore —a— when the key is adjusted for use, said contact points being, therefore, wholly within the length of the bore, while the periphery of the key at the ends of the arches will be spaced from the walls of said bore when the key is adjusted for use so that the key will be held in place by relatively small areas of contact at the high points of the arches, as distinguished from the usual cotter key in which the area of contact is coextensive with that portion of the key which is inclosed within the bore.

In some instances, it may be desired to expand the protruding ends of the key to a greater extent than that effected by the normal tension, and for this purpose the adjacent faces of the extreme ends of the arms —2— are beveled at —4— to afford shoulders or contact surfaces adapted to be engaged by a hammer or similar instrument, whereby either protruding end may be deflected or bent outwardly without interfering with the other arm.

What I claim is:

A cotter pin including a pair of arms, the arms being bowed outwardly to provide a plurality of adjacent concave portions and contacting portions, the extreme diameters of the bowed portions being greater than the bore adapted to receive the same whereby the free ends of the arms are spread apart a distance greater than the diameter of the bore upon compression of the bowed portions.

In witness whereof I have hereunto set my hand this 1st day of April, 1915.

JOHN G. PFISTER.

Witnesses:
H. E. CHASE,
ALICE M. CANNON.